US010064504B2

(12) United States Patent
Hogrefe

(10) Patent No.: US 10,064,504 B2
(45) Date of Patent: Sep. 4, 2018

(54) SUPPORT PLATE, SUPPORT-PLATE COMPOSITE CONSISTING OF AT LEAST TWO SUPPORT PLATES, SUPPORT-PLATE SYSTEM AND METHOD FOR CONNECTING AT LEAST TWO SUPPORT PLATES

(71) Applicant: Thomas Hogrefe, Bremen (DE)

(72) Inventor: Thomas Hogrefe, Bremen (DE)

( * ) Notice: Subject to any disclaimer, the term of this patent is extended or adjusted under 35 U.S.C. 154(b) by 0 days.

(21) Appl. No.: 15/113,886

(22) PCT Filed: Feb. 23, 2015

(86) PCT No.: PCT/EP2015/053753
§ 371 (c)(1),
(2) Date: Jul. 25, 2016

(87) PCT Pub. No.: WO2015/124775
PCT Pub. Date: Aug. 27, 2015

(65) Prior Publication Data
US 2016/0345754 A1    Dec. 1, 2016

(30) Foreign Application Priority Data

Feb. 24, 2014    (DE) .................... 10 2014 102 361

(51) Int. Cl.
*A47G 1/06* (2006.01)
*F16M 13/02* (2006.01)

(52) U.S. Cl.
CPC ............. *A47G 1/065* (2013.01); *F16M 13/02* (2013.01)

(58) Field of Classification Search
CPC .... A47G 1/065; A47G 1/0627; A47G 1/0616; A47G 1/215; A47G 1/1686; F16M 13/02;
(Continued)

(56) References Cited

U.S. PATENT DOCUMENTS 2,278,695 A * 4/1942 Fluss ................ A47G 1/065
40/124
2,317,708 A * 4/1943 Zareko ............. A47G 1/065
16/237

(Continued)

FOREIGN PATENT DOCUMENTS

DE    2 258 012 A    6/1973
DE    79 12 191 U1    8/1979
(Continued)

OTHER PUBLICATIONS

International Search Report of PCT/EP2015/053753, dated Jun. 22, 2015.

*Primary Examiner* — Patrick D Hawn
(74) *Attorney, Agent, or Firm* — Collard & Roe, P.C.

(57) ABSTRACT

The invention relates to a support plate 2 for receiving a presentation object, wherein the support plate 2 has a useful surface 4 for attaching the presentation object and a rear side 6 for attaching connecting elements 8. A detachable connection between two support plates 2 can be produced with at least one connecting element 8 per support plate 2, with at least one connecting element 8 being arranged on each support-plate edge 10. In such case, the connecting elements 8 are integrated in the rear side 6 of the support plate 2 such that, if the connecting elements 8 do not enter into any connection with a further support plate 2, they are not visible from the useful surface 4.
Further, the invention relates to a support-plate composite 34 which has at least two support plates 2, and to a method for connecting at least two support plates 2 according to the invention or for producing a support-plate composite 34 according to the invention.

11 Claims, 6 Drawing Sheets

Figure 1:
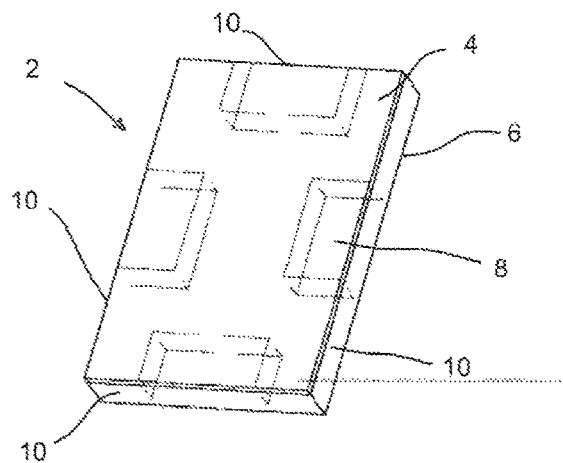

(58) Field of Classification Search
CPC .......... G09F 1/12; G09F 1/10; G09F 15/0012; G09F 15/0018; G09F 15/0068; G09F 15/0006; F16B 12/2009; F16B 5/00; F16B 5/0004; F16B 5/06; F16B 5/0607; F16B 5/0621; F16B 5/0692; F16B 2005/0678
USPC .................................................. 40/729–731
See application file for complete search history.

(56) References Cited

U.S. PATENT DOCUMENTS

| | | | | |
|---|---|---|---|---|
| 3,070,914 | A * | 1/1963 | Henderson | A47G 1/0605 40/730 |
| 3,425,586 | A * | 2/1969 | Petters | B65D 21/0201 220/23.4 |
| 3,471,959 | A * | 10/1969 | Seger | G09F 15/0006 40/605 |
| 3,523,382 | A * | 8/1970 | Dreyer | A47G 1/065 40/605 |
| 3,529,374 | A * | 9/1970 | Spertus | A47G 1/065 40/730 |
| 3,722,122 | A * | 3/1973 | Sesto | A47G 1/065 40/730 |
| 3,964,511 | A | 6/1976 | Cattermole | |
| 4,017,989 | A * | 4/1977 | Murray | A47G 1/065 40/605 |
| 4,043,477 | A * | 8/1977 | Deese | G09F 5/00 206/0.83 |
| 4,608,770 | A * | 9/1986 | Gray | A47G 1/065 40/730 |
| 4,706,397 | A * | 11/1987 | Hesener | A47G 1/065 40/730 |
| 4,912,863 | A | 4/1990 | Harvey | |
| 5,267,403 | A * | 12/1993 | Hesner | A47G 1/065 220/23.4 |
| 5,588,240 | A | 12/1996 | Zilliox | |
| 5,761,839 | A * | 6/1998 | Heikkila | G09F 7/08 40/730 |
| 6,054,968 | A * | 4/2000 | De Matteo | G09F 15/0068 312/7.2 |
| 6,347,472 | B1 | 2/2002 | Dominguez | |
| 7,363,739 | B2 * | 4/2008 | Dalsey | A47G 1/0627 40/729 |
| 7,437,846 | B2 * | 10/2008 | Franco | A47G 1/065 206/449 |
| 7,958,688 | B2 | 6/2011 | Vilar Llop et al. | |
| 8,092,114 | B2 * | 1/2012 | Baur | E05B 63/123 292/241 |
| 8,327,567 | B2 * | 12/2012 | Swick | A47G 1/065 248/121 |
| 9,687,091 | B2 * | 6/2017 | Jhagroo | A47G 1/065 |
| 2003/0056413 | A1 * | 3/2003 | Wiemer | G09F 7/00 40/730 |
| 2005/0223611 | A1 * | 10/2005 | Dennis | A47G 1/065 40/729 |
| 2006/0042140 | A1 * | 3/2006 | Frew | A47G 1/065 40/729 |
| 2006/0185211 | A1 * | 8/2006 | Dalsey | A47G 1/0627 40/729 |
| 2008/0204474 | A1 | 8/2008 | Franco et al. | |
| 2013/0104434 | A1 * | 5/2013 | Taylor | A47G 1/0633 40/729 |

FOREIGN PATENT DOCUMENTS

DE 20 2006 008 513 U1 9/2006
GB 2 053 675 A 2/1981

* cited by examiner

SUPPORT PLATE, SUPPORT-PLATE COMPOSITE CONSISTING OF AT LEAST TWO SUPPORT PLATES, SUPPORT-PLATE SYSTEM AND METHOD FOR CONNECTING AT LEAST TWO SUPPORT PLATES

CROSS REFERENCE TO RELATED APPLICATIONS

This application is the National Staqe of PCT/EP2015/053753 filed on Feb. 23, 2015, which claim priority under 35 U.S.C. § 119 of German Application No. 10 2014 102 361.7 filed on Feb. 24, 2014, the international application under PCT article 21 (2) was not publish in English.

The invention relates to a support plate for receiving a presentation object to a support-plate composite of at least two such support plates, to a support-plates system with at least one support plate, and to a method for connecting at least two support plates.

Two-dimensional presentation objects, such as for example photos, drawings etc., or alternatively three-dimensional presentation objects, such as design objects, letters, symbols etc., are nowadays common as wall decoration articles. In such case, it is often desirable to put the presentation objects together in groups, in order to present them as a whole.

Conventionally, the presentation objects which are to be put together have to be hung next to one another or placed on a common base. This however results in the disadvantage that it is not possible, or is possible only laboriously, to change the combination of the presentation objects for a short time.

DE 20 2006 008 513 U1 discloses a connecting element for connecting individual pictures. Although these can be hung as one unit because of the connection, they have the disadvantage: that the individual wall elements are arranged spaced apart from each other.

U.S. Pat. No. 7,958,688 B2 discloses an assembly system for connecting tiles, in which a curved fastening means is pushed into a groove on the underside of the tile, such an assembly system not being suitable for arranging presentation objects.

DE 2 258 012 A discloses a locking or connection device for holding a large number of articles together. To connect two-dimensionally formed elements, such as two metal sheets, the locking element is arranged either above the sheet or below the sheet, as a result of which the uniform appearance is disrupted and such a connection device is unsuitable for a presentation.

U.S. Pat. No. 4,912,863 A discloses a modular picture frame system for putting together pictures to form a display in any manner whatsoever. For this purpose, the system has one or more separate connecting elements as a transverse strip.

It is an object of the invention to provide a simple way of connecting presentation objects in order to put them together in groups.

This object is achieved with a support plate according to one aspect of the invention, with a support-plate composite according to another aspect of the invention, with a support-plate system according to a further aspect of the invention with a fastening rail according to another aspect of the invention and with a method for connecting at least two support plates according to an additional aspect of the invention.

The support plate according to the invention serves as a wall decoration and has a useful surface for attaching a presentation object and a rear side with connecting elements integrated therein, with a detachable, preferably non-positive, positive and/or factional, connection between at least two such support plates being able to be produced with at least one connecting element per support plate. This means that advantageously a connection arrangement of presentation objects can be changed rapidly and uncomplicatedly again and again.

The support plate can be-manufactured in one piece, e.g. as an injection-moulded plastics part, or may be composed of different materials, in order to obtain sufficient stabilisation or as low as possible a weight, depending on requirements or on the field of application.

When producing such a support plate from different materials, the relatively hard top layer, which has the useful surface, is provided with positioning pins, and the further plate layer is provided with holes. When assembling the individual layers of the support plate, the positioning pins are inserted into the holes in order to permit simple and precise positioning of the individual plate layers relative to one another.

In an alternative production method for the support plate according to the invention, initially various material layers, such as a plastics material plate and a foam plate, are connected, in particular glued together. Then the support plate proper is milled out of this material composite. In a further milling operation, the individual connecting elements are detached on the rear side of the support plate, the depth of incision preferably extending, into the first hard top layer.

"Presentation objects" are understood to mean two-dimensional presentation objects, such as for example photos, drawings etc., but also three-dimensional presentation objects, such as design objects, letters, symbols etc. In such case, the support plate is configured according to the invention so as to be fastened to a vertical surface as a wall element.

The support plate is preferably designed to be rectangular or square, or has any other symmetrical form which can be joined together without any spacing to form a surface, for example a hexagonal or triangular form. In such case, the support plates are of the same size as each other or are designed to be of different sizes. When using support plates of different sizes, these are advantageously of such dimensions that they can be connected to form a gap-free support-plate composite.

This means for example in the case of support plates which are rectangular or square that two adjoining support plates have two touching support-plate edges. These touching support-plate edges are either of the same length or are designed to be of different lengths. In the case of touching support-plate edges of different lengths, the longer of these touching support-plate edges of the one support plate is a multiple of the shorter of these touching support-plate edges of the other support plate.

The invention, in the case of touching support-plate edges of different lengths, is not restricted to the longer of the touching support-plate edges being a multiple of the shorter of the touching support-plate edges. Likewise, touching support-plate edges of which the longer of these touching support-plate edges has a side length which is a multiple of the lowest common divisor of the length units of the two touching support-plate edges are possible. In such case, the lowest common divisor of the length units of the two touching support-plate edges is formed from the set of proper divisors, and from the set of trivial divisors merely if one of the length units is a prime number. Thus for example a support-plate edge with nine length units and a support-plate edge with six length units can be connected, since the lowest common divisor from the set of proper divisors is three, and nine and six are each a multiple of three.

On each support-plate edge there is arranged at least one connecting element, the connecting elements being integrated in the rear side of the support plate and all the connecting elements being designed identically.

The connection between two support plates is formed by two identically designed connecting elements per connection point, each support plate providing one connecting element per connection point for connecting the support plates. This has the advantage that a connection between two support plates is possible at any time, without using additional parts.

The connecting elements are arranged concealed on the rear side of the support plate, i.e. if the connecting elements do not enter into any connection or are unused, they are integrated in the rear side of the support plate such that they are not visible from the useful surface of the support plate and do not project beyond the surface of the rear side.

In order to place presentation objects, for example photos, drawings etc., and also 3D design objects, e.g. letters, symbols etc. or other applications, on the support plate advantageously in simple manner, the useful surface of the support plate is provided e.g. with an adhesive surface. The presentation objects can however also be fastened to the support plate by means of rivets or screws.

The connecting elements are configured such that, in the event that they do not enter into any connection with a further support plate, they terminate flush with the respectively adjoining support-plate edge. For example, the connecting elements are inserted into a respective associated recess on the rear side of the support plate. As a result, the support plate advantageously obtains a uniform appearance without disruptive depressions or projecting lengths In the edge region of the support plate.

In a further preferred embodiment of the invention, the connecting elements are designed as identically designed plug-in parts for producing a plug-in connection between two support plates. With these puzzle-like plug-in parts, the support plates can be connected without any spacing.

Due to the fact that the plug-in parts are designed identically, they can be inserted into any recess on the rear side of the support plate, so that advantageously the support plates can be connected as desired to any support-plate edge in order to produce an individual surface.

In a further preferred embodiment of the invention, the plug-in parts are configured symmetrically, in puzzle-like manner, such that two plug-in parts placed together can be plugged, rotated by 90°, into a corresponding recess on one rear side of the support plate which is to be connected in each ease, the support plates being laid against one another such that the opposing free recesses on the rear side form a common recess for receiving two plug-in parts.

The symmetrical configuration of the plug-in parts ensures that two plug-in parts placed together can advantageously be plugged with a precise fit into a placed-together recess of two adjoining support plates, as a result of which a substantially positive connection between the support plates is produced.

In a further preferred embodiment of the invention, one long side of the plug-in part is designed to be straight, in order, when not in use and when received in a recess on the rear side of the support plate, advantageously to terminate flush with the support plate.

In order to achieve particularly great stability of the connection between two support plates, the support plates are preferably composed from various materials of different strengths. Thus the support plate has for example a first plate layer, containing the useful layer, of a hard injection-moulded plastics material and a second plate layer of a softer material than the first plate layer. The second plate layer, due to the soft material, advantageously ensures better friction when using the plug-in parts, as a result of which advantageously the hold of these plug-in parts in the recess is increased.

In order to bring about great stability of the connection, the recess for receiving the plug-in part on the rear side of the support plate extends over both plate layers. If then a plug-in part, preferably made of a hard material, is inserted into the recess, the plug-in part is held not only by the soft material of the second plate layer, but likewise by the hard first plate layer, as a result of which advantageously greater stability of the connection, in particular with respect to existing tensile forces, increases.

Further, the plug-in part is preferably provided with means for hanging the support plate, these hanging means possibly being for example a hole, in particular an elongate hole. As a result, the support plate can advantageously be fastened to a wall by means of a nail or hook.

As an alternative to a hole for hanging the support plate on a nail or hook, the long side of the plug-in part which lies opposite the straight long side of the plug-in part is initially formed such that it can hold on a nail or hook. This can be produced for example by a curved or triangular indentation in the side of the plug-in part, in that the position of the nail is automatically centred, on the plug-in part. The plug-in part can additionally be configured with a depression on the rear side in the region of the indentation, so that a nail or hook for hanging the support plate can grip under this indentation. In the region of this depression, the plug-in part has a lesser material thickness. Advantageously, the indentation also serves for easy removal of the plug-in part from the recess on the rear side of the support plate, as a result of which advantageously it is possible to connect the support plates without a tool.

According to a further preferred embodiment of the invention, the plug-in part has oh its underside at least two projections or formed-on portions which are visible on the rear side of the plug-in part merely in the removed state. These projections advantageously ensure better stability of the connection between the support plates. For this, the projections grip in a corresponding hole or depression in each case within the recess on the rear side of the support plate. In order to increase the stability of the connection further, the projections may be conically shaped, so that in addition to the positive connection which exists upon inserting the projections into the depression advantageously additionally a non-positive connection is produced.

According to an alternative embodiment of the invention, the connecting elements of a support plate are designed as identically designed sliding parts for producing a sliding connection between two support plates. With sliding parts which are tints designed, the support plates can advantageously be connected without any spacing.

Due to the fact that the sliding parts are designed identically, they can be inserted into each recess on the rear side of the support plate, so that advantageously the support plates can be connected as desired to each support-plate edge in order to generate an individual surface.

According to a further preferred embodiment of the invention, the sliding parts are configured symmetrically such that two sliding parts placed together can be pushed, rotated by 90°, into a corresponding recess on the rear side of the support plates which are to be connected.

In such case, the sliding parts are preferably designed to be rectangular, the long side of the sliding part being designed-to be twice as long as the short side of the sliding part. Owing to such a configuration, two sliding parts placed together form a square shape, which can advantageously be pushed with a precise fit into two placed-together recesses of two support plates which are to be connected, as a result of which a substantially positive connection between the support plates is produced.

In a further preferred embodiment of the invention, the sliding parts have a groove which runs on three sides, one long side of the sliding part being provided without a groove so that this side of the sliding part when not in use terminates flush with the support-plate edge.

Further, the associated recess on the rear side of the support plate is provided with a spring which runs on three sides, so that the sliding part pushed into the recess enters into a tongue-and-groove connection with the support plate.

To connect two support plates, two sliding parts are placed together on the long side without a groove and pushed, rotated by 90°, into a recess of a first support plate. Since the one long side of the sliding part does not have a groove, the spring is interrupted on the long side within the recess on the rear side of the support plate, so that the sliding parts which are placed together and rotated by 90° can be pushed with a precise fit into the recess in the support plate.

To connect two support plates, the second support plate with the free recess on the rear side is then pushed onto the projecting sliding parts.

Further, an elongate hole is provided centrally in fee sliding part, while the recess on the rear side of the support plate is provided with two formed-on portions. In such case, the elongate hole is of such dimensions that in the state pushed into the recess in each case a formed-on portion is located with in the elongate hole on the narrow side of the elongate hole.

In such case, the formed-on portions and the elongate hole are arranged symmetrically such that the formed-on portions in the connected state as well, i.e. rotated by 90°, are located on the narrow sides within the elongate hole. As a result, sufficient strength is imparted to the sliding part in the recess in the support plate to hang the support plate.

Preferably the formed-on portions have flattened-off edges in order to facilitate pushing-over of the sliding part. Owing to the formed-on portions, a non-positive or frictional connection is also present in addition to a positive connection, so that the connection advantageously has a better hold and can be hung on a nail or hook by means of the elongate hole in the sliding part.

According to an alternative embodiment of the invention, the connecting elements are provided as identically designed rotary parts for producing a clamping connection between two support plates. As a result, advantageously a connection between two support plates without any spacing is possible.

Owing to the fact that the rotary parts are designed identically, the support plates can be connected as desired to a further support plate on each support-plate edge in order to produce an individual surface.

In a further preferred embodiment of the invention, the rotary part is configured as a part of a circular ring disc which is mounted rotatably or displaceably in a guide groove, in particular a guide groove which runs in a semicircle, in the rear side of the support plate.

Such a con figuration of the connecting parts as rotary parts has the advantage that no connecting elements can become lost, since they are integrated in fixed manner in the rear side of the support plate.

In order to connect two support plates by means of the rotary parts, they are laid against one another such that the guide grooves of one rotary part in each case lie opposite one another. By simultaneously turning the opposing circular ring disc parts of the two rotary parts of the support plates which are to be connected, the circular ring disc parts are pushed beyond the respective edge of the support plate, as a result of which part of the respective guide groove is uncovered on each support plate.

At the same time, the circular ring disc parts are pushed into the now-free guide groove which is opposite in each case, as a result of which a rapid, positive connection between the support plates is produced which can be opened again just as quickly.

Preferably the circular ring disc parts are configured to be substantially semicircular, but they may assume any portion of a circular ring disc which is suitable for producing a secure and fixed connection between two support plates.

In a further preferred embodiment of the invention, the part of the circular ring disc or the circular ring disc part of the rotary part has a guide part which is arranged on the upper side of the circular ring disc part and preferably terminates flush with the rear side of the support plate. This guide part is arranged displaceably in a substantially semicircular guide cutout in the rear side of the support plate. The guide part advantageously facilitates the rotary movement of the rotary part and specifies the extent of the rotary movement by moving the guide part in the guide cutout from one stop to the other stop.

Further, the guide part has a finger opening which advantageously facilitates the rotary movement of the rotary part in that a ringer can engage in the depression.

Preferably a rotary movement of the circular ring disc parts of substantially 90° is provided. The invention is however not restricted to a 90° rotation. Rather, any rotary movement which permits a fixed connection between the support plates is conceivable.

The use of rotary parts as connecting elements advantageously produces a particularly stable connection between the support plates, since the support plates cannot be detached from one another either by tensile forces or by compressive or shearing forces.

The above object is further achieved by a support-plate composite consisting of at least two support plates according to the invention.

For this, the support plates are detachably connected or put together without any spacing to form a support-plate composite by means of at least two identically designed connecting elements. In such case, the connection can advantageously be continued as desired on all sides of the support plate in order to produce an individual wall configuration.

For connecting two support plates, each connection point is formed by two identically designed connecting elements, each support plate providing in each case one connecting element per connection point.

One particular advantage of the invention consists in that individual support plates can be removed from or exchanged in an existing support-plate composite without great expense.

The above object is further achieved by a support-plate system with at least one support plate according to the invention. For this, the support-plate system has at least one support plate and a fastening rail, to which two, three or more system connection elements, in particular plug-in system parts, for mounting at least one support plate are fastened.

The support-plate system has the advantage that a fastening rail mounted in fixed manner, e.g. on a wall, can be equipped particularly simply with support plates which change again and again.

Furthermore, the above object is achieved by a fastening rail for receiving at least one support plate according to the invention, the fastening rail having two, three or more system connection elements which are connected to the fastening rail in fixed manner or detachably.

The system connection elements are configured according to the invention such that they are half received with a precise fit by a recess on the rear side of the support plate. In such case, one system connection element corresponds exactly to two plug-in parts placed together. As a result, two or more support plates can be arranged on the fastening rail without any spacing, in that one system connection element in each ease is inserted into one recess in each case of two adjoining support plates.

The distances between the system connection elements are selected dependent on the support plates which are to be fastened.

Finally, the invention achieves the above object with a method for connecting at least two support plates according to the invention or with a method for producing a support-plate composite according to the invention, wherein each connection is formed, by two identically designed connecting elements.

Figure 2:
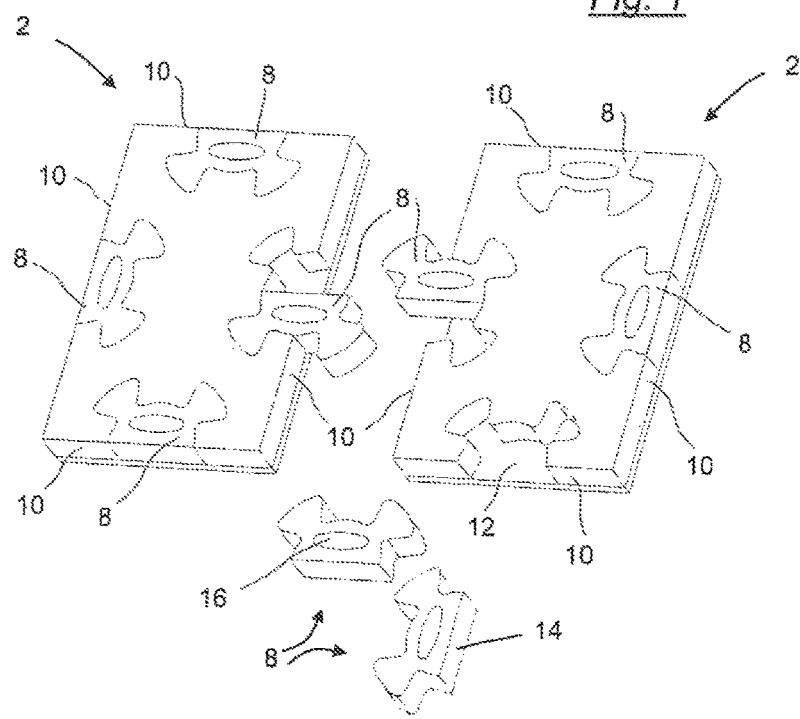
Figure 3:
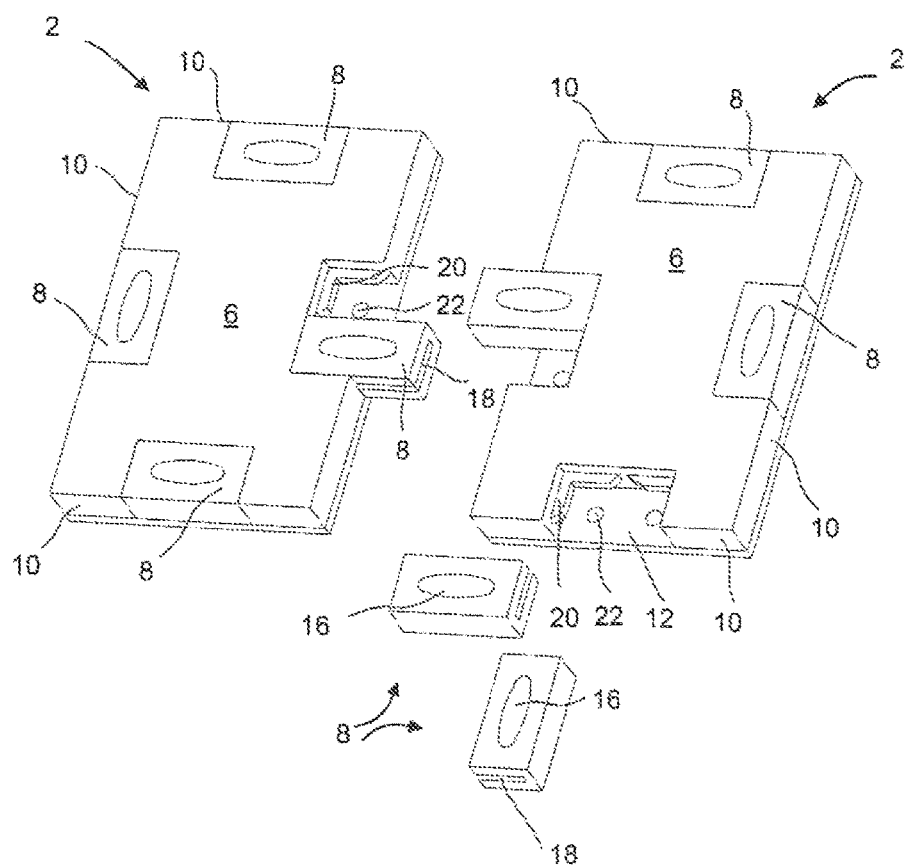
Figure 4:
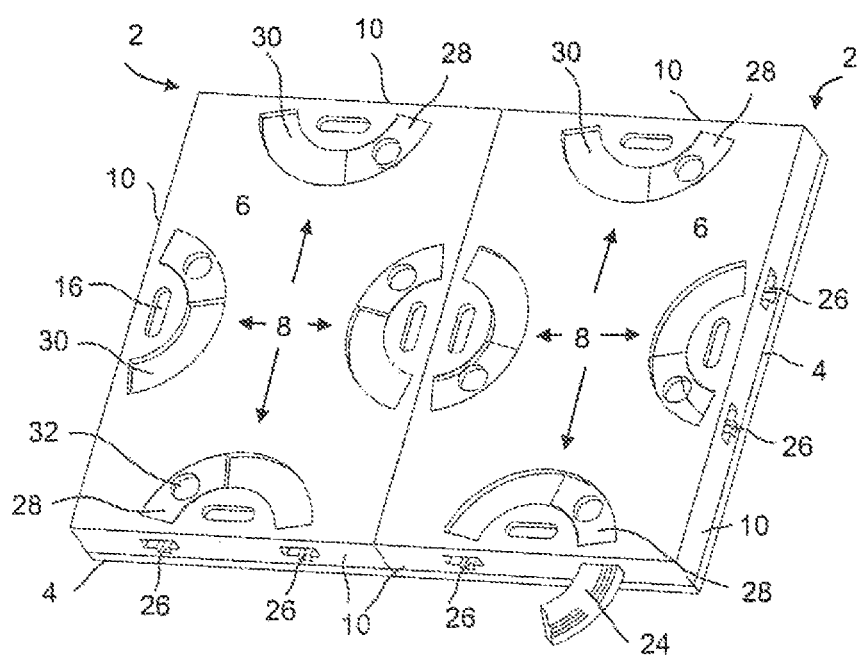
Figure 5:
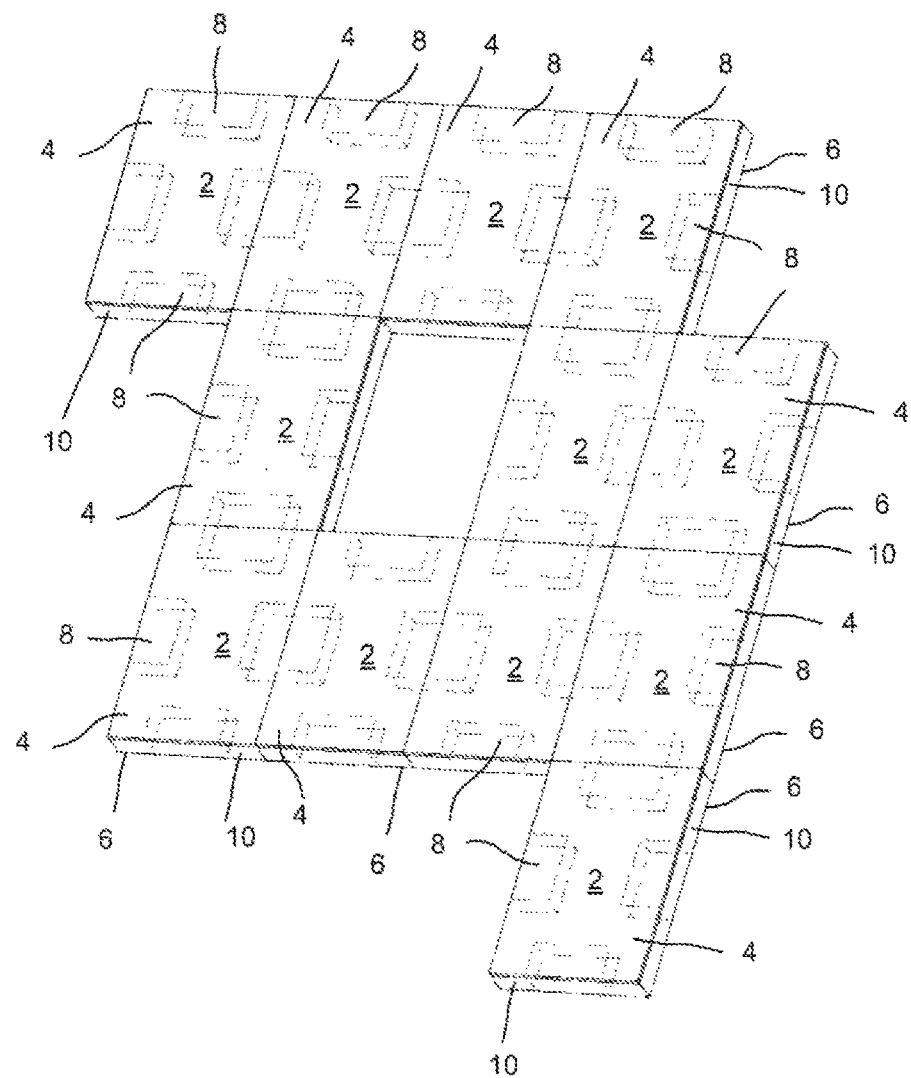
Figure 6:
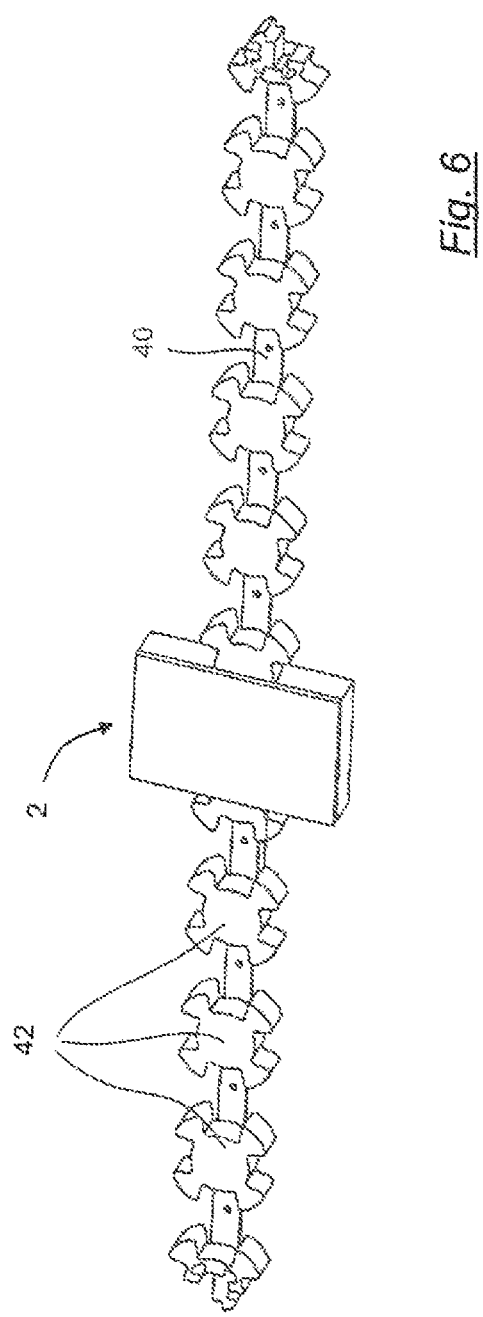
Figure 7:
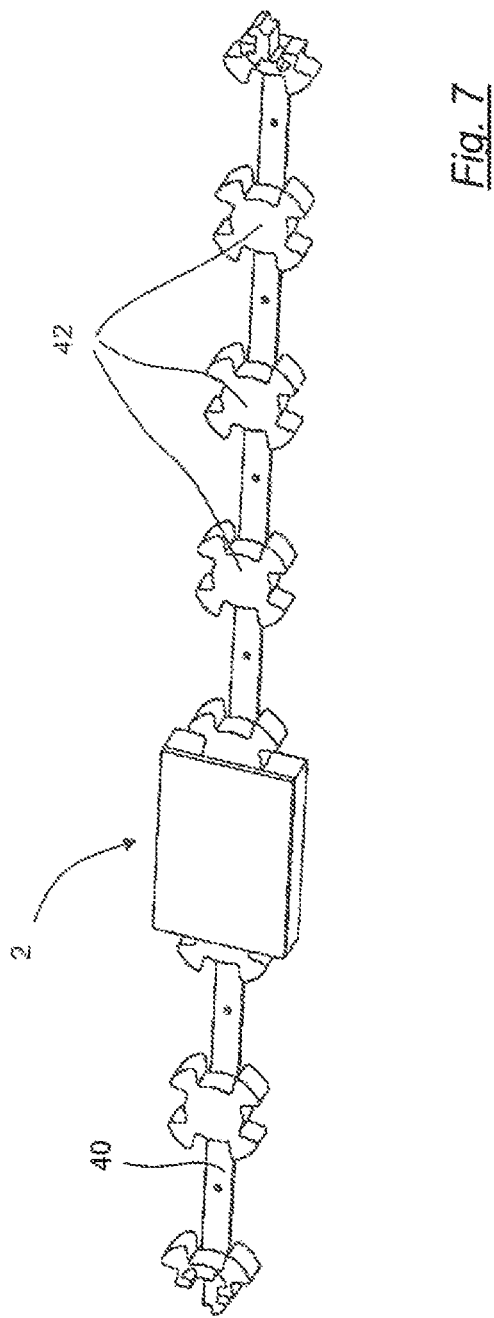

Depending on requirements, a detachable connection between at least two support plates can be produced by means of the identically designed connecting elements, the connecting elements required for the connection being integrated in the rear side of the support plates which are to be connected. As a result, advantageously a connection arrangement of support plates without a tool or other aids and additional parts which can both be fastened to or hung from a vertical surface, in particular wall, or can be set up on a horizontal surface, in particular desk, shelf etc., is possible.

further embodiments of the invention will become apparent from the claims and from the examples of embodiment which are explained in greater detail with reference to the drawings. The drawings depict:

FIG. 1 a perspective view of a support plate with schematically indicated connecting elements, FIG. 2 a perspective view of two support plates with plug-in parts for producing a plug-in connection, FIG. 3 a perspective view of two support plates with sliding parts for producing a sliding connection, FIG. 4 a perspective view of two support plates with rotary parts for producing a clamping connection, FIG. 5 a perspective view of a support-plate composite, FIG. 6 a perspective view of a support-plate system with fastening rail and vertically mounted support plate, and FIG. 7 a perspective view of a support-plate system with fastening rail and horizontally mounted support plate.

FIG. 1 shows a perspective view of a support plate 2 according to the invention, which is intended as a decorative wall support plate, with a useful surface 4 and a rear side 6. The support plate 2 shown in FIG. 1 is designed to be rectangular. The invention is however not restricted to a rectangular form of the support plate 2. Rather, any symmetrical forms which can be joined to each other without any spacing to form a surface are conceivable, such as a hexagonal or triangular form.

On the rear side 6 of the support plate 2 there are arranged schematically indicated connecting elements 8, with at least one connecting element & being located on one support-plate edge 10 in each ease.

The support plate 2 can be advantageously produced inexpensively in large numbers as a plastics-material part by a suitable injection-moulding method. Alternatively, it is conceivable to produce the support plate 2 from cross-linked polyethylene foam or foam rubber, the hardness and cell structure being selectable depending on the type and degree of foaming. This has the advantage that the support plate is particularly lightweight. Production of the support plate from wood or metal by milling, stamping or a different type of shaping is however likewise conceivable, as is also a combination of different materials.

For attaching a presentation object, the useful surface 4 of the support plate 2 may be provided with an adhesive layer. The presentation object may however also be fastened by means of rivets or screws. Further, 3D presentations can also be introduced directly into the useful surface by thermoforming.

FIG. 2 shows a perspective view of two support plates 2 with connecting elements 8 which are designed as puzzle-shaped plug-in parts 8.

The plug-in parts 8 are arranged on all the support-plate edges 10 and are configured such that they can be inserted with a precise fit into a recess 12 on the rear side 6 of the support plate 2.

Further, the plug-in parts 8 have a first long side 14 which is designed to be straight, in order to terminate flush with the support-plate edge 10 if the plug-in part 8 is located in the recess 12 when not in use.

In order to produce a detachable plug-in connection between two support plates 2, on the support-plate edges which are to be joined together the plug-in parts 8 are taken out, the support plates 2 with the recesses 12 are laid against one another, the plug-in parts 8 are placed together on their straight long sides 14 and are re-inserted, rotated by 90°, into the recess 12.

The symmetrical, puzzle-shaped configuration of the plug-in parts 8 advantageously ensures a fixed positive connection between the support plates 2.

Preferably the plug-in parts 8 have means 16 for hanging, in particular a centrally-arranged elongate hole, as a result of which the support plate 2 can be fastened on a nail or hook on a wall or other vertical display surface. Further, the elongate hole 16 in the plug-in part 8 serves for easy intervention in order to take the plug-in part 8 out of the recess 12 in simple manner.

In order to obtain a uniform surface on the rear side 6 of the support plate 2, the plug-in parts 8 in the recess 12 preferably terminate flush with the surface of the rear side 6 of the support plate 2.

FIG. 3 shows a perspective view of two support plates 2 with connecting elements 8 which are designed as rectangular sliding parts 8. The sliding parts 8 are likewise arranged on all the support-plate edges 10, so that connection of the support plate 2 on ail sides is possible.

The sliding parts 8 are preferably designed to be rectangular, the long side of the sliding part 8 being twice as long as the short side of the sliding part 8. Two sliding parts 8 placed together thus form a square which fits with a precise fit into two placed-together recesses 12 of adjacent support plates 2.

As also with the plug-in parts 8 shown in FIG. 2, the sliding parts 8 have means 16 for hanging the support plate 2, in particular an elongate hole 16, as a result of which the support plate 2 can be fastened on a nail or hook on a wall or other vertical display surface. Further, the elongate hole 16 in the sliding part 8 serves for easy intervention in order to push the sliding part 8 out of the recess 12 simply.

Further, the sliding part 8 has a groove 18 which runs on three sides which can be pushed onto an associated spring in the recess 12 on the rear side 6 of the support plate 2. This applies both to storage when not in use and also to connection of two support plates 2 in which two sliding parts 8 laid against one another are pushed into a recess 12 and the second support plate 2 which is to be connected is pushed with the adjoining recess 12 onto the sliding parts 8 which are laid against one another.

In order that the sliding parts 8 terminate flush with the support-plate edge 10 when not in use, they have an edge without a groove. To connect the support plates 2, attention must be paid that the sliding parts 8 which are placed together are placed together with the side without a groove 18. In order then to be able to push it entirely into the recess 12, the spring 20 is interrupted in the middle on the long side of the recess 12.

Finally, two formed-on portions 22 or noses 22 are arranged in the recess 12 on the rear side 6 of the support plate 2, the edges of which portions or noses are preferably flattened off, so that the sliding part 8 can be pushed over the formed-on portions 22.

In order to achieve a fixed hold of the sliding part 8 in the recess 12, the formed-on portions 22 latch into the narrow side of the elongate hole. This happens both in the pushed-in state when the sliding part 8 is not in use and in the connection state, if the sliding part 8 is rotated by 90°.

FIG. 4 shows a perspective view of two support plates 2 with connecting elements 8 which are designed as rotary parts 8. The rotary parts 8 are arranged on all the support-plate edges 10 in order to permit connection of the support plates 2 oil all sides.

Small recesses 16 are provided on all support-plate edges 10 for hanging the support plate 2, e.g. on a wall or other vertical display surface.

In order to produce a clamping connection between two support plates 2, the rotary part 8 has a part of a circular ring disc 24 which is designed in such a way as to produce a fixed connection between the support plates 2, but in particular preferably to be semicircular. This part of a circular ring disc 24 or this circular ring disc part 24 is rotatably or displaceably mounted in a guide groove 26.

To connect the support plates 2, they are placed together such that two rotary parts 8 lie opposite one another. Simultaneous turning or displacement of the respective circular ring disc part 24 of the rotary parts 8 guides the circular ring disc part 24 out of the support-plate edge 10 and into the opposite support plate 2.

In order to simply displace the circular ring disc part 24, a guide part 28 is fastened to the circular ring disc part 24, which guide part is arranged displaceably in a guide cutout 30. The guide part 28 specifies the extent of the rotary movement, in that the guide part 28 can be moved from one stop to the other stop.

By turning the opposing circular ring disc parts 24, they are introduced into the opposing guide groove 26 in each case, as a result of which a clamping connection between the support plates 2 is produced. Preferably a substantially 92° rotation of the circular ring disc parts 24 is effected. However, alternatively any rotary movement which produces a fixed connection between the support plates 2 is conceivable.

To facilitate the rotary movement, the guide part 28 has a finger opening 32, as a result of which rotation of the guide part 28 from stop to stop is possible without an additional tool.

FIG. 5 shows a perspective view of a support-plate composite 34 consisting of a plurality of support plates 2 according to one of the preceding embodiments. In FIG. 5, as also in FIG. 1, the connecting elements 8 are indicated schematically, in order to make it clear that any type of connecting elements 8 embodied above can be used to produce a support-plate composite 34 according to the invention. In such case it should however be taken into account that the various embodiments of the connecting elements 8 (plug-in, sliding or rotary part) cannot be combined with one another. A support-plate composite 34 always has identically designed connecting elements 8.

The support plate 2 according to the invention provides an individual possible configuration for the support-plate composite 34, since the support plates 2 can be connected to each side as often as desired.

At the same time, reconfiguration of the support-plate composite 34 for a short time due to the simple and rapid possibility of connection by means of the connecting elements integrated in the support plate 2 is advantageously possible without a tool and additional parts. In the case of a clamping or plug-in connection by means of rotary parts or plug-in parts, it is even possible to exchange individual support plates 2 without breaking up the support-plate composite 34.

FIG. 6 shows a perspective view of a support-plate system in which, a vertical support plate 2, or one oriented in a portrait format, is mounted on a fastening rail 40. For mounting the support plate 2, the fastening rail 40 has a plurality of system connection elements 42 which are arranged regularly spaced apart from one another.

The system connection elements 42 correspond in their configuration to two plug-in parts 8 placed together and therefore fit exactly into one recess in each case on the rear side of two support plates 2 laid against one another.

FIG. 7 shows a perspective view of a support-plate system in which a horizontal support plate 2, or one oriented in a transverse format, is mounted on a fastening rail 40. Here too, the system connection elements 42 are arranged uniformly spaced apart, the distance between the system connection elements 42 being dependent on the dimensions of the support plate 2 to be fastened to the fastening rail 40.

The fastening, rail 40 of the support-plate system according to the invention is fastened for example to a wall and the desired support plates 2 are placed on. A support-plate system of this type has the advantage that the design of the presentation can be permanently varied. Thus advantageously rapid, simple and frequent changing of the support plates 2 is possible.

All the features named in the preceding description and in the claims can be combined both individually and in any combination with the features of the independent claims. The disclosure of the invention is therefore not restricted, to the combinations of features described or claimed. Rather, all the combinations of features which are useful in the context of the invention are to be regarded as disclosed.

The invention claimed is:

1. A support plate for receiving a presentation object, wherein the support plate has a useful surface for attaching the presentation object and a rear side for attaching connecting elements,
wherein a detachable connection between at least two support plates can be produced with at least one connecting element per support plate,
wherein at least one recess is provided at each support-plate edge,
wherein in case the connecting elements do not enter into any connection with a further support plate a connecting element is arranged in each recess, the connecting elements being integrated in the rear side of the support plate such that the connecting elements do not project beyond the support-plate edge,
wherein the connecting elements are configured so as to connect two or more support plates with a useful surface pointing in the same direction in each case without any spacing,
wherein the connecting elements, in the event that they do not enter into any connection with a further support plate, terminate flush with the respective adjoining support-plate edge,
wherein the connecting elements are identically designed plug-in parts for producing a plug-in connection between two support plates, in order to connect them without any spacing, and
wherein one long side of the plug-in part is designed to be straight, in order, when not in use and when received in a recess on the rear side of the support plate, to terminate flush with the support-plate edge.

2. A support plate according to claim 1, wherein the plug-in parts have a symmetrical configuration such that plug-in parts can be taken out, and rotated by 90°, and then two plug-in parts placed together can be plugged into a corresponding recess on in each case one rear side of the support plates which are to be connected.

3. A support plate according to claim 1, wherein the plug-in part is provided with at least one of a hole and an indentation in order to fasten the support plate to a wall via a nail or hook.

4. A support plate according to claim 1, wherein the plug-in part has on its underside at least two noses or formed-on portions which grip in one corresponding depression or recess in each case on the rear side of the support plate.

5. A support-plate composite comprising at least two support plates according to claim 1,
wherein the support plates are connected detachably without any spacing to form a support-plate composite via at least two identically designed connecting elements, and
wherein the support plates are of the same or different sizes, with in the case of support plates of different sizes the support plates being of such dimensions that they can be connected to form a gap-free support-plate composite.

6. A method for connecting at least two support plates according to claim 1 and for producing a support-plate composite, the method comprising steps of:
providing a first support plate having a useful surface for attaching a presentation object, and having a rear side for attaching connecting elements, having at least one recess at each support-plate edge, wherein in case the connecting elements do not enter into any connection with a further support plate a connecting element is arranged in each recess, the connecting elements being integrated in the rear side of the first support plate such that the connecting elements do not project beyond the support-plate edge, wherein the connecting elements, in the event that they do not enter into any connection with a further support plate, terminate flush with the respective adjoining support-plate edge,
providing a second support plate having a useful surface for attaching a presentation object, and having a rear side for attaching connecting elements, having at least one recess at each support-plate edge, wherein in case the connecting elements do not enter into any connection with a further support plate a connecting element is arranged in each recess, the connecting elements being integrated in the rear side of the second support plate such that the connecting elements do not project beyond the support-plate edge, wherein the connecting elements, in the event that they do not enter into any connection with a further support plate, terminate flush with the respective adjoining support-plate edge,
aligning the first support plate next to the second support plate so that the useful surface of the first support plate and the useful surface of the second support plate point in the same direction, and
producing a detachable connection between the first support plate and the second support plate via a first connecting element of the connecting elements of the first support plate and via a first connecting element of the connecting elements of the second support plate, wherein the two first connecting elements are identically designed.

7. A support-plate system with at least one support plate for receiving a presentation object, wherein the support plate has a useful surface for attaching the presentation object and a rear side for attaching connecting elements,
wherein a detachable connection between at least two support plates can be produced with at least one connecting element per support plate,
wherein at least one recess is provided at each support-plate edge,
wherein in case the connecting elements do not enter into any connection with a further support plate a connecting element is arranged in each recess, the connecting elements being able to be integrated in the rear side of the support plate such that the connecting elements do not project beyond the support-plate edge, and
wherein the support-plate system has a fastening rail to which two, three or more system connection elements are fastened for mounting at least one such support plate on the fastening rail.

8. A support-plate system according to claim 7, wherein the connecting elements are identically designed plug-in parts for producing a plug-in connection between two support plates, in order to connect them without any spacing.

9. A fastening rail for producing a support-plate system according to claim 7, wherein the fastening rail has two, three or more identically designed system connection elements, the system connection elements being configured such as to be fitted with a precise fit into in each case a recess on the rear side of two adjoining support plates, and with distances between the system connection elements dependent on the support plates which are to be fastened.

10. A support plate for receiving a presentation object, wherein the support plate has a useful surface for attaching the presentation object and a rear side for attaching connecting elements,
wherein a detachable connection between at least two support plates can be produced with at least one connecting element per support plate,
wherein at least one recess is provided at each support-plate edge,
wherein in case the connecting elements do not enter into any connection with a further support plate a connecting element is arranged in each recess, the connecting elements being integrated in the rear side of the support plate such that the connecting elements do not project beyond the support-plate edge, wherein the connecting elements are configured so as to connect two or more support plates with a useful surface pointing in the same direction in each case without any spacing, wherein the connecting elements, in the event that they do not enter into any connection with a further support plate, terminate flush with the respective adjoining support-plate edge, wherein the connecting elements are identically designed sliding parts for producing a sliding connection between two support plates, in order to connect them without any spacing, and wherein the sliding parts have a groove which runs on three sides, and a recess on the rear side of the support plate has a spring, and the sliding part pushed into the recess enters into a tongue-and-groove connection with the support plate and/or the sliding part centrally has an elongate hole for hanging and a recess on the rear side of the support plate has two formed-on portions, the elongate hole being of such dimensions that in the state pushed into the recess in each case a formed-on portion is located in the elongate hole on the narrow sides of the elongate hole.

11. A support plate according to claim 10, wherein the sliding parts are configured such that sliding parts can be rotated by 90° and then two sliding parts placed together can be pushed into a corresponding recess on in each case one rear side of the support plates which are to be connected.

\* \* \* \* \*